United States Patent
Jeon et al.

(10) Patent No.: US 9,606,543 B2
(45) Date of Patent: Mar. 28, 2017

(54) METHOD AND CONTROL APPARATUS FOR COOPERATIVE CLEANING USING MULTIPLE ROBOTS

(71) Applicant: Electronics and Telecommunications Research Institute, Daejeon (KR)

(72) Inventors: Seo Hyun Jeon, Gyeonggi-do (KR); Min Su Jang, Daejeon (KR); Dae Ha Lee, Daejeon (KR); Chang Eun Lee, Daejeon (KR); Hyun Ja Im, Daejeon (KR); Young Jo Cho, Gyeonggi-do (KR); Jae Hong Kim, Daejeon (KR); Jong Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 122 days.

(21) Appl. No.: 14/254,322

(22) Filed: Apr. 16, 2014

(65) Prior Publication Data

US 2015/0148951 A1 May 28, 2015

(30) Foreign Application Priority Data

Nov. 27, 2013 (KR) ........................ 10-2013-0145482

(51) Int. Cl.
G05B 19/418 (2006.01)
G05D 1/02 (2006.01)
A47L 11/24 (2006.01)

(52) U.S. Cl.
CPC ............ *G05D 1/0297* (2013.01); *A47L 11/24* (2013.01); *G05D 1/0219* (2013.01);
(Continued)

(58) Field of Classification Search
CPC .... A47L 11/24; A47L 2201/04; G05D 1/0219
See application file for complete search history.

(56) References Cited

U.S. PATENT DOCUMENTS 8,295,978 B2* 10/2012 Cho .................... G05D 1/0291
700/246
2004/0249511 A1* 12/2004 Jager .................... G05D 1/0287
700/248

(Continued)

FOREIGN PATENT DOCUMENTS

KR 10-2012-0058945 A 6/2012
KR 10-2012-0061532 A 6/2012
KR 10-2013-0061921 A 6/2013

OTHER PUBLICATIONS

P. Garcia, P. Caamano, F. Bellas, and R. Duro, "A Behavior Based Architecture with Auction-Based Task Assignment for Multi-robot Industrial Applications," In Proc. IWINAC 2009, 2009, pp. 372-381.*

(Continued)

*Primary Examiner* — Thomas G Black
*Assistant Examiner* — Peter D Nolan
(74) *Attorney, Agent, or Firm* — Rabin & Berdo, P.C.

(57) ABSTRACT

Provided are a method and a control apparatus for cooperative cleaning using multiple cleaning robots, including monitoring an overall cleaning condition of an extensive space and automatically assigning multiple cleaning robots to a space required to be cleaned, and when a cleaning area is fixed based on a cooperative cleaning method, data on an amount of garbage generated from the cleaning area or a cleaning condition of the cleaning area may be accumulated to facilitate easier management of the cleaning.

20 Claims, 13 Drawing Sheets

(52) U.S. Cl.
CPC ........ G05D 1/0274 (2013.01); *A47L 2201/04* (2013.01); *G05D 2201/0203* (2013.01); *Y10S 901/01* (2013.01); *Y10S 901/30* (2013.01)

(56) References Cited

U.S. PATENT DOCUMENTS

| | | | |
|---|---|---|---|
| 2010/0094459 A1* | 4/2010 | Cho | G05D 1/0291 700/248 |
| 2015/0367513 A1* | 12/2015 | Gettings | G06Q 10/06 700/248 |

OTHER PUBLICATIONS

A. Ahmadi and P. Stone, "A Multi-Robot System for Continuous Area Sweeping Tasks," In Proc. 20006 IEEE Intl. Conf. on Robotics and Automation, May 2006, pp. 1724-1729.*

* cited by examiner

210

220

310

320

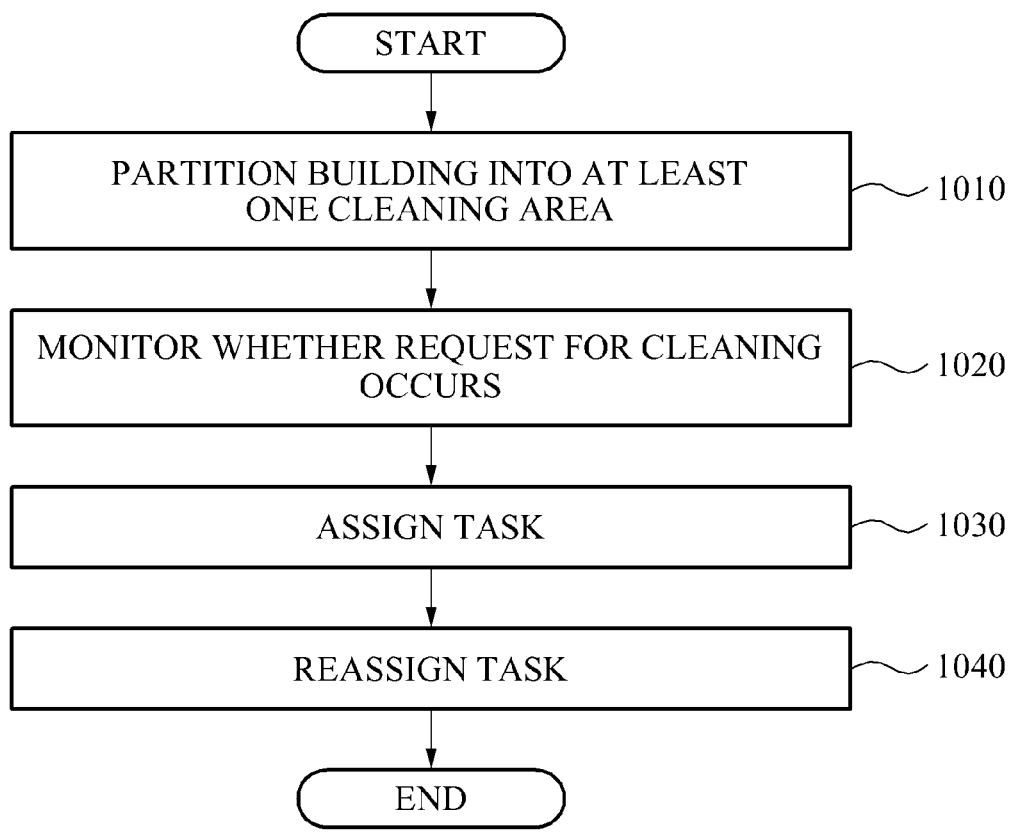

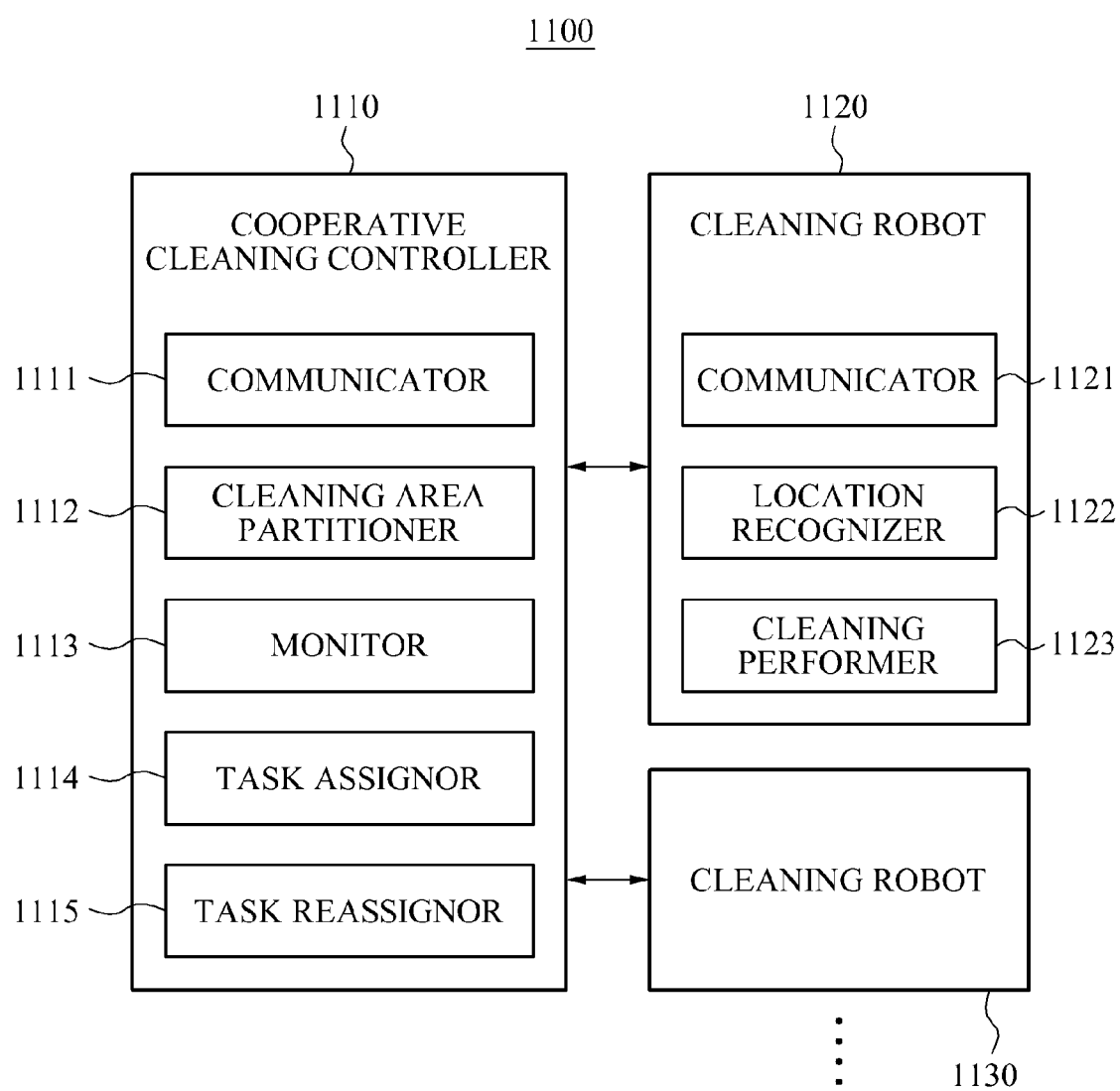

METHOD AND CONTROL APPARATUS FOR COOPERATIVE CLEANING USING MULTIPLE ROBOTS

CROSS-REFERENCE TO RELATED APPLICATION

This application claims the priority benefit of Korean Patent Application No. 10-2013-0145482, filed on Nov. 27, 2013, in the Korean Intellectual Property Office, the disclosure of which is incorporated herein by reference.

BACKGROUND

1. Field of the Invention

The present invention relates to a method and a control apparatus for cooperative cleaning using multiple robots, and more particularly, to a cooperative cleaning method and a cooperative cleaning controller that may monitor an overall cleaning condition of an extensive space and automatically relocate cleaning robots to an area of the space required to be cleaned.

2. Description of the Related Art

To clean an expansive space, for example, an airport, a department store, and an amusement park, a person responsible for cleaning may require a vehicle to traverse the full area. Human involvement in cleaning may be a repetitive and arduous task requiring a high labor cost. Also, the cleaning may be only performed during a predetermined period of time and accordingly, a desired level of cleanliness may not be continuously maintained. A high-capacity cleaning robot for a building, in addition to a home cleaning robot that may automatically perform the cleaning, has been developed. However, a single cleaning robot may not clean a wide area alone, for example, an airport, and thus, multiple cleaning robots may be required. When multiple automatic cleaning robots are deployed to the space without a systematic plan, cleaning areas may overlap or a cleaning area may not be cleaned at all. At present, a human operator may be needed to assign a cleaning area to the cleaning robots to equally divide the cleaning areas. However, the assignment by the human operator may result in inconvenience and difficulty in providing an immediate response to a changing environment, for example, a space in which a sudden increase in an amount of garbage may occur.

SUMMARY

According to exemplary embodiments of the present invention, provided is a method and a control apparatus for cooperative cleaning using multiple robots that may effectively perform the cleaning by automatically assigning a cleaning area to cleaning robots, monitoring a moving route and a number of tasks performed by the cleaning robots, and deploying the cleaning robots to a non-overlap area.

According to exemplary embodiments of the present invention, provided is a method and a control apparatus for cooperative cleaning using multiple robots that may minimize resources to be invested and maintain overall cleanliness over an expansive space by partitioning the space into at least one cleaning area and deploying a minimum number of cleaning robots needed to clean each cleaning area.

According to an aspect of the present invention, there is provided a cooperative cleaning method including monitoring whether a request for cleaning occurs, and assigning an area cleaning task to multiple cleaning robots when the request for cleaning occurs.

The monitoring may be performed based on an amount of garbage collected by the multiple cleaning robots from a cleaning area or an amount of dust in the cleaning area measured by a dust measuring sensor of the multiple cleaning robots.

The assigning may be performed based on at least one of a size, an amount of garbage, and a priority of the cleaning area.

The cooperative cleaning method may further include reassigning a task to the multiple cleaning robots based on information received from the multiple cleaning robots.

The information received from the multiple cleaning robots may include information on at least one of a location, a load capacity, a battery status, and a breakdown occurrence for each of the multiple cleaning robots, and whether an amount of garbage in the cleaning area rapidly increases.

The reassigning may be performed to maximize a task efficiency of the multiple cleaning robots.

The reassigning may include, when at least one of the multiple cleaning robots is inoperative, transmitting a signal requesting a substitute for the inoperative robot from adjacent cleaning robots, receiving, from the adjacent cleaning robots, a reply to the signal requesting the substitute based on an individual status of the adjacent cleaning robots, and reassigning a task of the inoperative robot to a cleaning robot sending the reply and from which a maximum task efficiency is expected.

The reassigning may include appointing at least one of the multiple cleaning robots as a lead robot based on at least one of a location, a load capacity, a battery status, and a breakdown occurrence of each of the multiple cleaning robots, and reassigning the task to the multiple cleaning robots by the lead robot.

The location of each of the multiple cleaning robots may include one of an absolute location using a marker in the cleaning area and a relative location without using the marker.

The cooperative cleaning method may further include partitioning an entire building into at least one cleaning area using one of physical partitioning, virtual partitioning, and arbitrary partitioning, and modifying the at least one partitioned cleaning area based on an amount of garbage in each cleaning area.

According to another aspect of the present invention, there is provided a cooperative cleaning method including assigning an area cleaning task to multiple cleaning robots when a request for cleaning occurs and reassigning a task to the multiple cleaning robots when at least one of the multiple cleaning robots becomes inoperative.

The assigning may be performed based on at least one of a size, an amount of garbage, and a priority of the cleaning area.

The reassigning may include, when at least one of the multiple cleaning robots is on standby, reassigning a task to the standby cleaning robot, and, when none of the multiple cleaning robots are on standby, reassigning a task to a cleaning robot assigned to a different cleaning area.

The reassigning of the task to the cleaning robot assigned to the different cleaning area may be performed to maximize a task efficiency of the multiple cleaning robots.

The reassigning of the task to the cleaning robot assigned to the different cleaning area may include transmitting a signal requesting a substitute to cleaning robots assigned to the different cleaning area, receiving, from the cleaning robots assigned to the different cleaning area, a reply to the signal requesting the substitute based on an individual status of the cleaning robots, and reassigning a task of the inoperative cleaning robot to a cleaning robot sending the reply and from which a maximum task efficiency is expected.

The reassigning of the task to the cleaning robot assigned to the different cleaning area may include appointing at least one of the multiple cleaning robots as a lead robot based on at least one of a location, a load capacity, a battery status, and a breakdown occurrence of each of the multiple cleaning robots, and allowing, by the lead robot, a lead robot of the different cleaning area to reassign a task to a cleaning robot assigned to the different cleaning area.

According to still another aspect of the present invention, there is provided a cooperative cleaning controller including a communicator to communicate with multiple cleaning robots, a task assignor to assign an area cleaning task to the multiple cleaning robots when a request for cleaning occurs, and a task reassignor to reassign a task to the multiple cleaning robots based on information received from the multiple cleaning robots.

The task assignor may assign the task based on at least one of a size, an amount of garbage, and a priority of the cleaning area.

When at least one of the multiple cleaning robots is on standby, the task reassignor may reassign a task to the standby cleaning robot. When none of the multiple cleaning robots are on standby, the task reassignor may reassign a task to a cleaning robot assigned to a different cleaning area.

The cooperative cleaning controller may further include a monitor to monitor whether the request for cleaning of the cleaning area occurs based on an amount of garbage collected by the multiple cleaning robots from the cleaning area or an amount of dust in the cleaning area measured by a dust measuring sensor of the multiple cleaning robots.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 10 is a flowchart illustrating a cooperative cleaning method using multiple cleaning robots according to an embodiment of the present invention; and FIG. 11 is a diagram illustrating a cooperative cleaning system according to an embodiment of the present invention.

DETAILED DESCRIPTION

Figure 1:
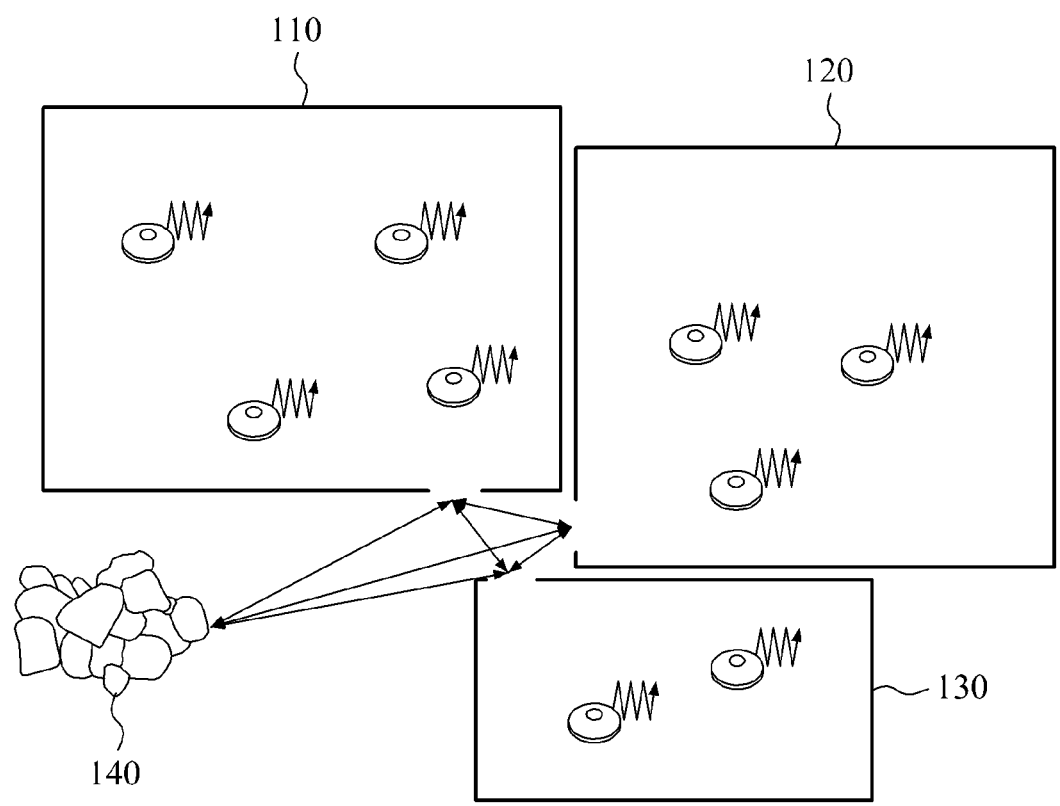
FIG. 1 is a diagram illustrating an example of cleaning performed using multiple cleaning robots according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating an example of cleaning performed using multiple cleaning robots according to an embodiment of the present invention.

Referring to FIG. 1, an entire building may be partitioned into a plurality of cleaning areas, for example, 110, 120, and 130. Multiple cleaning robots may be disposed in each cleaning area. A cleaning robot may be assigned a task by a cooperative cleaning controller and clean an assigned cleaning area. The cleaning robot may not always perform the cleaning only within the cleaning area assigned to the cleaning robot, and may move to a different cleaning area to clean the different cleaning area based on a progress of the cleaning. The cleaning robot may collect garbage to be dumped at a dumping area 140. The dumping area 140 may be located inside or outside of the building. The dumping area 140, a waiting area for the cleaning robots, and a cleaning robot charging station may be one identical area or different areas.

Figure 2A:
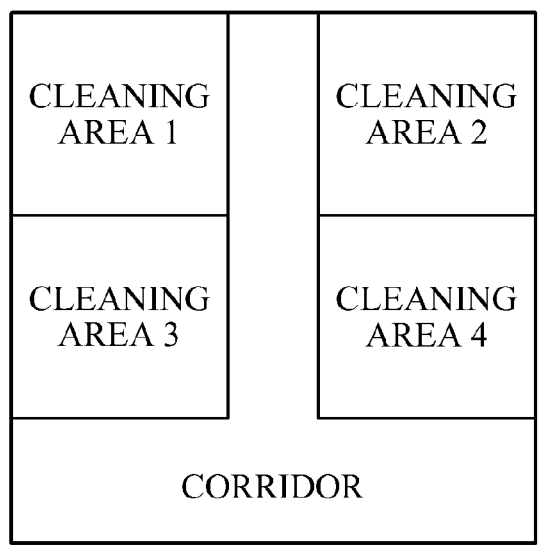
FIGS. 2A and 2B are diagrams illustrating an example of partitioning an entire building into at least one cleaning area and multiple cleaning robots assigned to the at least one cleaning area according to an embodiment of the present invention.
Figure 2B:
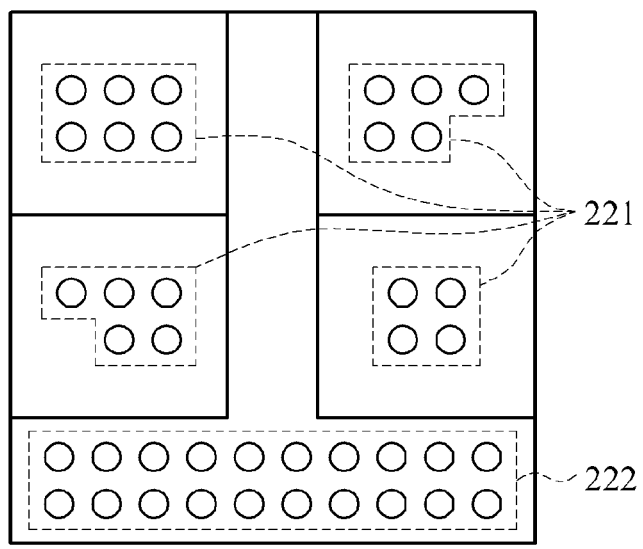

FIGS. 2A and 2B are diagrams illustrating an example of partitioning an entire building into at least one cleaning area and multiple cleaning robots assigned to the at least one cleaning area according to an embodiment of the present invention.

FIG. 2A is a diagram illustrating a cleaning area map 210 generated by partitioning an entire building into at least one cleaning area. For example, the building may be partitioned into four cleaning areas, and include cleaning areas 1, 2, 3, and 4 and a corridor. Although not classified as a cleaning area in this example, the corridor may also be classified as a cleaning area. For example, the corridor may also be a dumping area, a waiting place for cleaning robots, and a cleaning robot charging station.

According to an embodiment, the cleaning areas may be partitioned based on physical partitioning, virtual partitioning, arbitrary partitioning, and real-time partitioning based on an amount of garbage in a cleaning area.

The physical partitioning may be performed based on an existing structure of the building. The existing structure may refer to a structure forming the building and include a wall, a door, a pillar, and the like. Each separate space formed by the wall and the door may be partitioned into a distinct cleaning area through the physical partitioning.

The virtual partitioning may be virtually performed based on a purpose of each space of the building, in lieu of the physical structure. In an example of an airport, the entire building may be broadly partitioned into a departure gate, a duty-free shop, and a boarding gate through the virtual partitioning.

The user arbitrary partitioning may be arbitrarily performed by a user. A space that may be partitioned into one cleaning area through the physical partitioning or the virtual partitioning may be partitioned into a plurality of cleaning areas by the user.

The real-time partitioning based on the amount of garbage in a cleaning area may be performed by primarily partitioning a building into a cleaning area through performing one of the physical partitioning, the virtual partitioning, and the user arbitrary partitioning, and modifying the partitioned cleaning area based on the amount of garbage in the cleaning area. In order to increase a cleaning efficiency, the real-time partitioning may be used to modify a previously partitioned cleaning area based on the amount of garbage. A partitioning algorithm, for example, a voronoi diagram, may be used to modify the cleaning area.

The cleaning area map 210 may be automatically generated through the foregoing partitioning methods. A cooperative cleaning controller may store a repetitively used cleaning area map in a memory in advance, and search the memory for the map to read a cleaning area, as a need arises. The cleaning area on the found cleaning area map may be changed in real time based on an amount of garbage in the cleaning area.

Referring to FIG. 2B, multiple cleaning robots 221 may be assigned to at least one cleaning area. Also, standby cleaning robots 222 may be positioned in a predetermined area, for example, a dumping area 140 and a waiting place. The multiple cleaning robots 221 or the standby cleaning robots 222 may be reassigned with a task by a cooperative cleaning controller while the robots are performing each task. According to an embodiment, although the standby cleaning robots 222 may be required to be positioned, the standby cleaning robots 222 may not be positioned when all cleaning robots are assigned with a task or not in a usable state. A number of the standby cleaning robots 222 may be calculated based on a garbage generation amount and an operational efficiency based on a number of all cleaning robots.

Figure 3A:
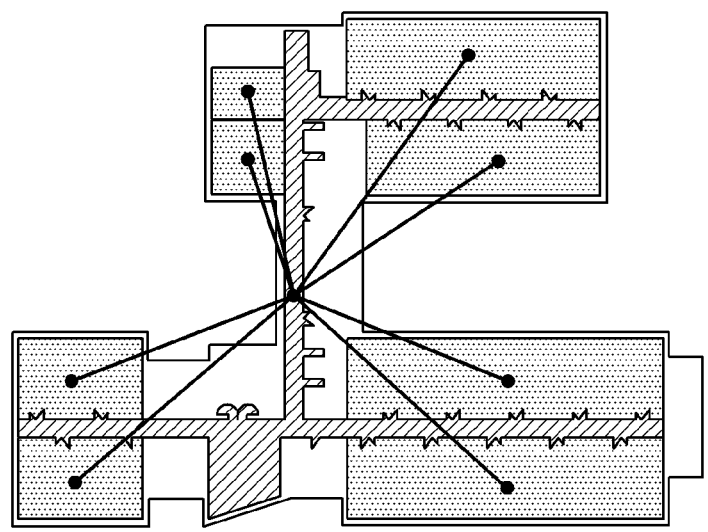
FIGS. 3A and 3B are diagrams illustrating cleaning areas represented by a topology map according to an embodiment of the present invention.
Figure 3B:
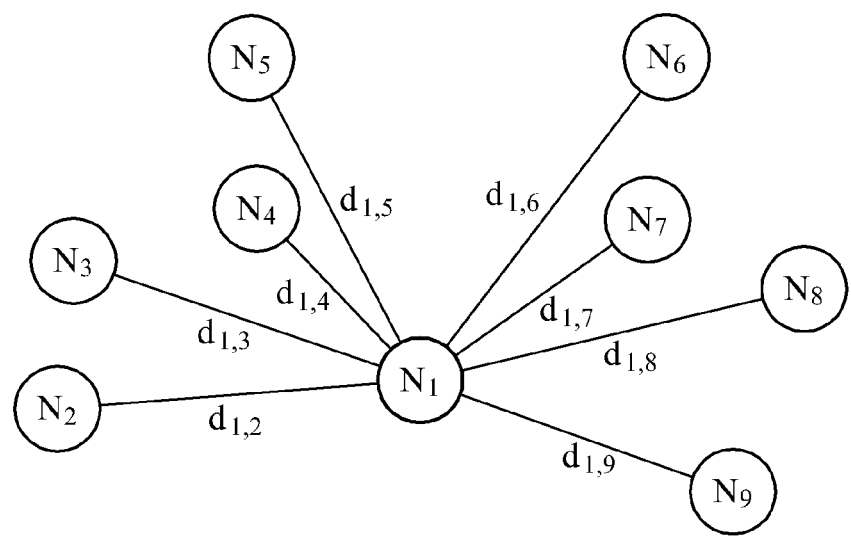

FIGS. 3A and 3B are diagrams illustrating cleaning areas represented by a topology map according to an embodiment of the present invention.

FIG. 3A illustrates a cleaning area map 310 and FIG. 3B illustrates a corresponding topology map 320.

The cleaning area map 310 of FIG. 3A may be represented by the topology map 320 of FIG. 3B. As shown in the topology map 320, each cleaning area may be represented as a node. Here, each node $N_i<A_i, \Delta_i>$ may be represented in terms of $A_i$, a size of a cleaning area, and $\Delta_i$, an increase in an amount of garbage. For example, the cleaning area map 310 may include a total of nine cleaning areas and correspondingly, the topology map 320 may include a total of nine nodes, $N_1$ through $N_9$. Here, $N_1$ may be connected to nodes, $N_2$ through $N_8$, and the connections may indicate moving routes, $d_{1,2}$ though $d_{1,9}$, of a cleaning robot. The topology map 320 may enable a more effective modeling of the cleaning areas and assignment of a task to multiple cleaning robots.

Figure 4:
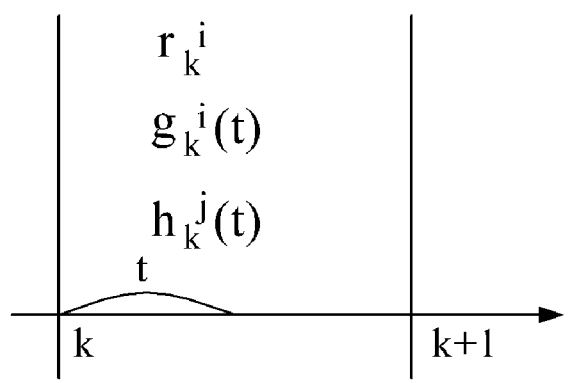
FIG. 4 is a graph displaying two time slots applied to a cooperative cleaning method according to an embodiment of the present invention.

FIG. 4 is a graph displaying two time slots applied to a cooperative cleaning method according to an embodiment of the present invention.

According to an embodiment, the cooperative cleaning method may apply the two time slots. The two time slots may denote a discrete time "k" and a continuous time "t." Here, a value of the discrete time k may increase on an individual basis when a task assigned to multiple cleaning robots is changed, for example, when a task is reassigned to the multiple cleaning robots. A value of the continuous time t may continuously increase from when a task is initiated until a subsequent task is assigned, for example, until a task is reassigned. For example, t may continuously increase during k and be reset to "0" at a point when k becomes "k+1." Here, $g_k^i(t)$ may denote an amount of garbage in an ith node during k, and $h_k^j(t)$ may denote an amount of garbage collected by a jth cleaning robot per unit time during k. Also, $r_k^i$ may denote a number of cleaning robots assigned to the ith node during k. Here, "i" and "j" may denote an index on a node and an index on a cleaning robot, respectively.

Figure 5:
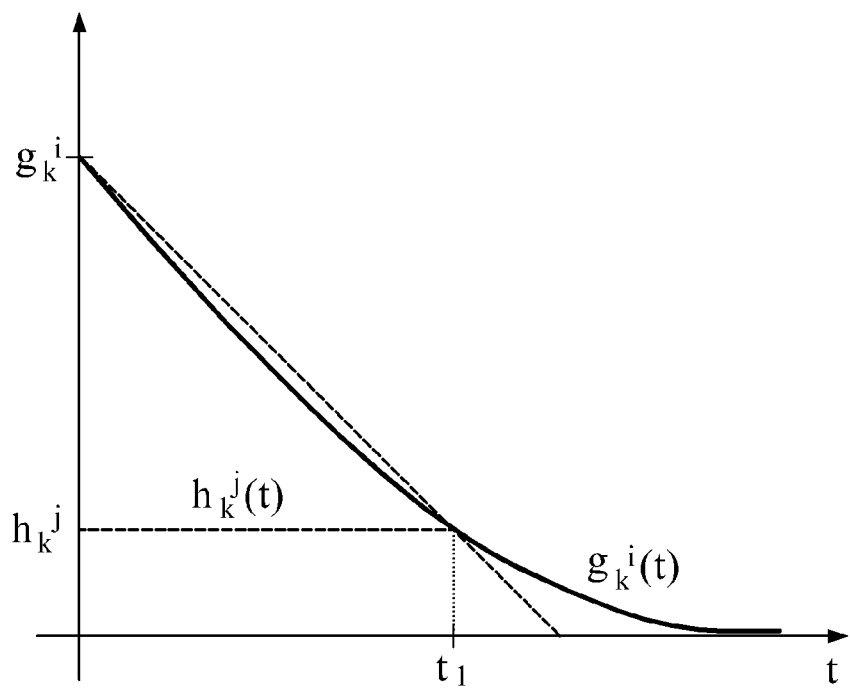
FIG. 5 is a graph displaying an absolute amount of garbage based on an amount of garbage collected by multiple cleaning robots per unit time according to an embodiment of the present invention.

FIG. 5 is a graph displaying an absolute amount of garbage based on an amount of garbage collected by multiple cleaning robots per unit time according to an embodiment of the present invention.

FIG. 5 illustrates a relationship between an amount of garbage $g_k^i(t)$ in an ith node during k and an amount of garbage $h_k^j(t)$ collected by a jth cleaning robot. In general, it may be difficult to measure an amount of garbage in each cleaning area. However, the amount of garbage may be estimated by learning accumulated data while cleaning is being repetitively performed. For example, the accumulated data may refer to an amount of garbage collected by a cleaning robot from a cleaning area per unit time.

According to an embodiment, the following assumptions may be made: i) an amount of garbage generated from each cleaning area may be measured by accumulating information on an amount of garbage collected by a cleaning robot per unit time, ii) garbage of each cleaning area may be linearly stacked, iii) garbage of each cleaning area may be equally distributed, iv) a workload of cleaning robots assigned to each cleaning area may be linear.

A cleaning robot may be represented as $R_i<P, C, T_w, T_c>$. Here, P may denote a cleaning performance per unit time of the cleaning robot that may be determined by a moving speed of the cleaning robot. C, $T_w$, and $T_c$ may denote a maximum garbage loading capacity, maximum working hours, and a maximum charging time, respectively. An accumulated garbage loading capacity of the cleaning robot may not exceed the maximum garbage loading capacity C, which may be represented as $C \geq h_k^j(t)$. For example, when the accumulated garbage loading capacity of the cleaning robot reaches the maximum garbage loading capacity C, or, when a garbage can of the cleaning robot is filled to capacity, the cleaning robot may be required to dump the collected garbage at a dumping area. When the garbage can of the cleaning robot is filled to capacity, the cleaning robot may be required to move to a dumping area to empty the garbage can. As shown in Equation 1 below, workable hours $t_w$ of a cleaning robot may be proportional to an amount of time $t_c$ during which the cleaning robot is charged.

$$t_w = \frac{t_c}{T_c} T_w \quad \text{[Equation 1]}$$

An amount of garbage collected by cleaning robots may relate to an amount of garbage in a node. When an amount of garbage remaining in the node is greater than a total amount of garbage, per unit time, that may be collectable by cleaning robots assigned to the node, the cleaning robots may collect garbage, commensurate with P, from the node. Conversely, when the amount of garbage in the node is less than the total amount of the collectable garbage, per unit time, by the cleaning robots assigned to the node, the cleaning robots may collect the garbage from the node, corresponding to a value obtained by dividing the amount of the garbage remaining in the node by a number of the cleaning robots. Here, the remaining garbage may be indicated in the graph of FIG. 5, and represented by the following equation.

$$h_k^j(t) = \begin{cases} P, & P \le \frac{g_k^i(t)}{r_k^i} \\ \frac{g_k^i(t)}{r_k^i}, & P > \frac{g_k^i(t)}{r_k^i} \end{cases} \quad \text{[Equation 2]}$$

$$h_k^j(t) = h_k^j(0) + \min\left(P, \frac{g_k^i(t)}{r_k^i}\right) \cdot t$$

$$g_k^i(t) = g_k^i(0) + A_i \cdot \Delta_i \cdot t - r_k^i \cdot \min\left(P, \frac{g_k^i(t)}{r_k^i}\right) \cdot t$$

For example, ten cleaning robots may each collect 10 grams (g) of garbage per unit time. Here, when each of the ten cleaning robots collects 2 g of garbage after one hour and collects 1 g of garbage after two hours, it may be assumed that cleaning of a cleaning area to which the cleaning robot is assigned may be completed at a time point "$t_1$" at which the cleaning robot collects a smaller amount of garbage than a maximum expectation. Also, based on a situation in which the cleaning robot subsequently collects the 1 g of garbage, an increase in an amount of the garbage that may be represented by $\Delta_i = r_k^i \times h_k^i(t)$ may be calculated. Here, $g_k^i(t)$ may be calculated using back tracking. When such data is accumulated, the amount of garbage in the cleaning area based on a time slot may be measured.

As described in the foregoing, an amount of garbage in a cleaning area may be estimated based on an amount of garbage collected by a cleaning robot or an amount of dust measured by a dust measuring sensor of the cleaning robot. Based on the estimated amount of garbage, whether a request for cleaning of a cleaning area occurs may be monitored. For example, a case in which the request for the cleaning occurs may include when an amount of garbage $g_k^i(t)$ in an ith node during k exceeds a threshold, when a ratio of the amount of garbage $g_k^i(t)$ in the ith node during k to a number $r_k^i$ of cleaning robots exceeds a threshold, and the like. Thus, how far the cleaning proceeds, or a progress of cleaning, may be monitored. Also, whether the amount of garbage is increased or decreased may be monitored.

Figure 6:
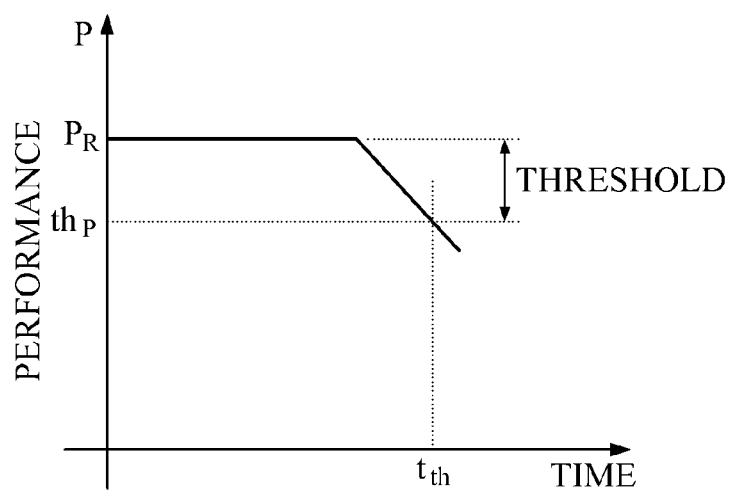
FIG. 6 is a graph displaying a cleaning performance achieved by multiple cleaning robots proceeding with cleaning based on time according to an embodiment of the present invention.

FIG. 6 is a graph displaying a cleaning performance achieved by multiple cleaning robots proceeding with cleaning based on time according to an embodiment of the present invention.

FIG. 6 illustrates a performance metric. Here, P may denote a cleaning performance per unit time of a cleaning robot. $P_R$ may denote a maximum cleaning performance per unit time of the cleaning robot. $th_p$ may denote a threshold used to classify a cleaning robot lacking the cleaning performance. When the cleaning performance rapidly decreases with time, it may be assumed that an inoperative robot occurs.

The cleaning robot lacking the cleaning performance may be in an inoperative state. Here, the cleaning robot in the inoperative state may refer to the inoperative cleaning robot no longer performing a task. The inoperative cleaning robot may include a normally inoperative cleaning robot and an atypical inoperative cleaning robot. The normally inoperative cleaning robot may refer to a cleaning robot of which a garbage can is filled to capacity and requires emptying, or a cleaning robot in a battery is depleted and requires charging. The abnormally inoperative cleaning robot may refer to a broken down cleaning robot no longer able to perform a task. The normally inoperative cleaning robot may return to a waiting place, be prepared to be enter an operative state, and be deployed to perform the task again. The atypical inoperative cleaning robot may be excluded from the task for a period of time. When the inoperative state occurs, a cooperative cleaning controller may monitor which cleaning robots are in the inoperative state.

Figure 7:
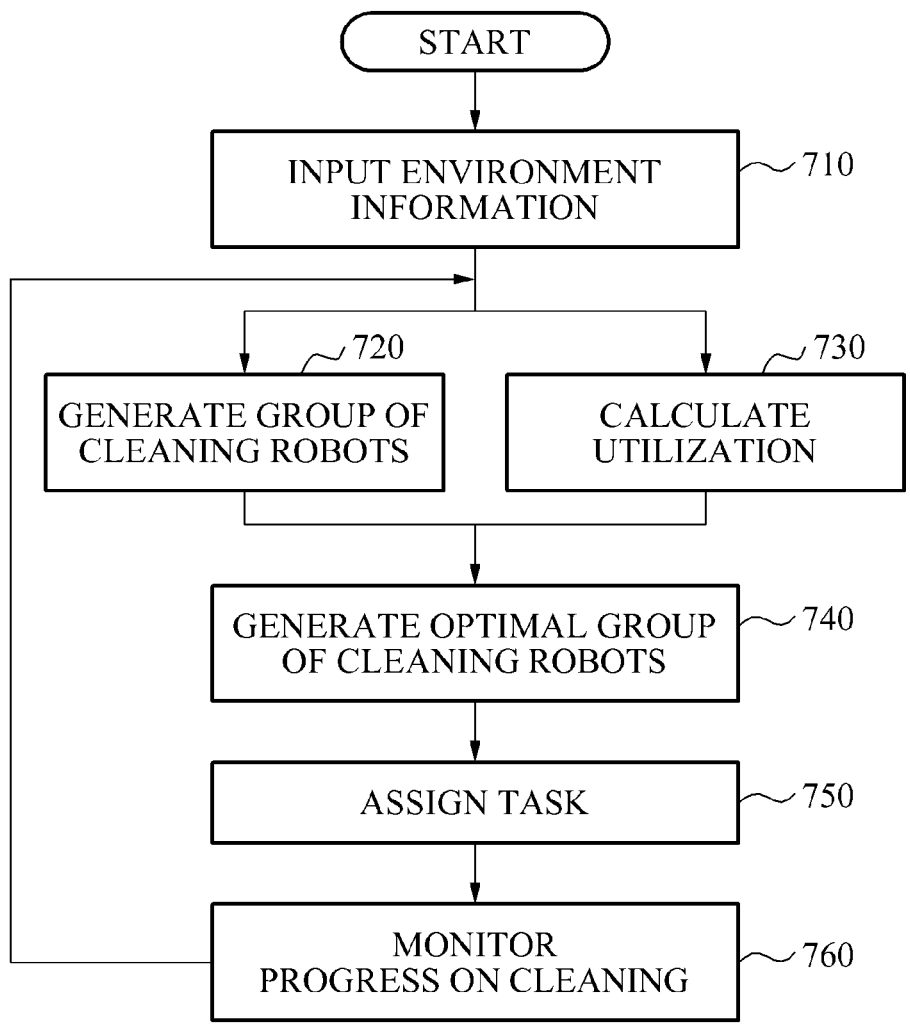
FIG. 7 is a flowchart illustrating a method of assigning a task to a cleaning robot according to an embodiment of the present invention.

FIG. 7 is a flowchart illustrating a method of assigning a task to a cleaning robot according to an embodiment of the present invention.

In operation 710, environment information may be received. The environment information may include an amount of garbage collected by cleaning robots from a cleaning area or an amount of dust in the cleaning area measured by a dust measuring sensor of the cleaning robots. Whether a request for cleaning of the cleaning area occurs may be monitored based on the environment information. In addition to a method of monitoring whether the request for the cleaning occurs based on the amount of garbage collected by the cleaning robots from the cleaning area or the amount of dust in the cleaning area, descriptions provided with reference to FIG. 5 may be applied thereto and thus, repeated descriptions will be omitted for conciseness.

In operation 720, a group of cleaning robots may be generated. The group of the cleaning robots may be generated corresponding to an area to be cleaned.

In operation 730, utilization may be calculated. The utilization of the generated group may be calculated. The utilization may be calculated by applying a weight to an item on which a user places emphasis, for example, a cleaning time and a minimum cleaning robot operation.

In operation 740, an optimal group of cleaning robots may be generated. The optical group of the cleaning robots may be generated based on the group of the cleaning robots and the utilization.

In operation 750, a task may be assigned to the cleaning robots. The task may be assigned to the cleaning robots based on the generated optimal group. Also, the task may be assigned based on at least one of a size, an amount of garbage, and a priority of a cleaning area. For example, the larger the size of the cleaning area, the greater the amount of garbage in the cleaning area, or the higher the priority of the cleaning area, preferential assignment of the cleaning robots to the cleaning area may be performed. For another example, when ratios of two selected from the size, the amount of garbage, and the priority are higher, preference may be given to the cleaning area when assigning the cleaning robots. For still another example, when at least two items of the size, the amount of garbage, and the priority is selected and a weight is applied on the selected items, the task may be assigned based on a sum of the weight put on the selected items. Each of the cleaning robots assigned with the task may move to the cleaning area assigned to the cleaning robot and perform a cleaning task.

In operation 760, a progress of the cleaning may be monitored based on the multiple cleaning robots. Here, the progress of the cleaning may be a comprehensive concept indicating all situations for which the cleaning is to proceed. Thus, the progress of the cleaning may include information on at least one of a location, a load capacity, a battery status, and a breakdown occurrence of a cleaning robot, and whether an amount of garbage is rapidly increased in the cleaning area. For example, the information on the at least one of the location, the load capacity, the battery status, the breakdown occurrence of the cleaning robot may be included in information received from the cleaning robot.

The progress of the cleaning may be known by way of a cleaning robot providing information on an individual status, or based on a decrease in a task performance index, for example, a performance metric. In operations 720 through 750, a task may be reassigned to the multiple cleaning robots based on the progress of the cleaning.

Figure 8:
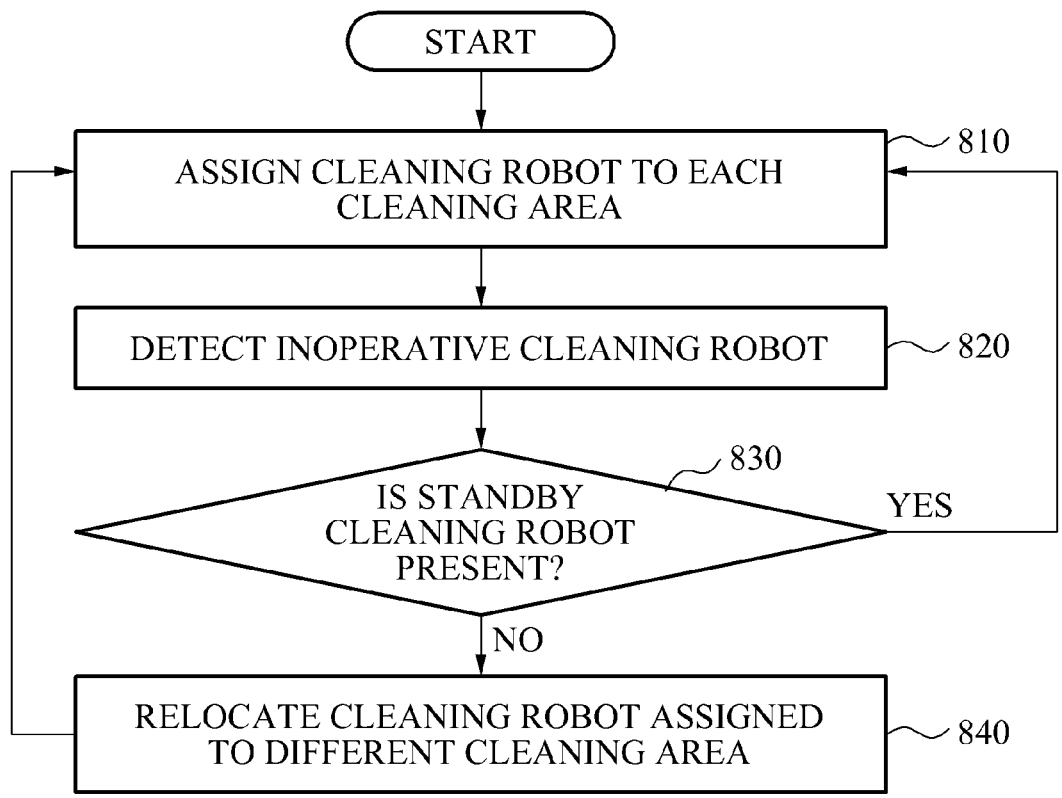
FIG. 8 is a flowchart illustrating a method of assigning a cleaning robot when an inoperative cleaning robot occurs according to an embodiment of the present invention.

FIG. 8 is a flowchart illustrating a method of assigning a cleaning robot when an inoperative cleaning robot occurs according to an embodiment of the present invention.

In operation 810, multiple cleaning robots may be assigned to each cleaning area. The multiple cleaning robots may be assigned to each cleaning area so that a result of calculating utility may be optimal. Descriptions provided with reference to FIG. 7 may be applied hereto and thus, repeated descriptions will be omitted here for conciseness.

In operation 820, whether the inoperative cleaning robot occurs may be detected. Descriptions provided with reference to FIG. 6 may be applied hereto and thus, repeated descriptions will be omitted here for conciseness.

In operation 830, whether a standby cleaning robot is present may be verified. Whether the standby cleaning robot is present in a waiting place may be verified.

When the standby cleaning robot is present, the standby cleaning robot may be assigned to a cleaning area to which the inoperative cleaning robot is assigned.

In operation 840, when the standby cleaning robot is absent, a cleaning robot assigned to a different cleaning area may be relocated. For example, a case in which the standby cleaning robot is absent may include standby cleaning robots being charged, or a broken down standby cleaning robot. Here, one of centralized assignment, distributed intelligence assignment, and hierarchical assignment may be used to relocate the cleaning robots assigned to the different cleaning area.

The centralized assignment may include reassigning a task to multiple cleaning robots to maximize a gain to the multiple cleaning robots. When a request for reassigning the task occurs, an overall gain to all of the multiple cleaning robots may be calculated and the task may be reassigned to the multiple cleaning robots to maximize the gain. Thus, the task may be reassigned to the multiple cleaning robots to maximize a task efficiency of the multiple cleaning robots.

The distributed intelligence assignment may include, i) when at least one of the multiple cleaning robots is in an inoperative state, transmitting a signal requesting a substitute from the inoperative cleaning robot or a cooperative cleaning controller detecting the inoperative state to adjacent cleaning robots being around the inoperative cleaning robot, ii) receiving, by the inoperative cleaning robot or the cooperative cleaning controller, a reply to the signal requesting the substitute that is sent from the adjacent cleaning robots based on each state of the adjacent cleaning robots, and iii) reassigning a task of the inoperative cleaning robot to a cleaning robot sending the reply and from which a maximum task efficiency is expected. Alternatively, the distributed intelligence assignment may include, i) holding an auction for a cleaning robot to perform a substitute role, for example, a task, of an inoperative cleaning robot A, ii) receiving a cost and a gain calculated based on each state of the multiple cleaning robots through communication with cleaning robots, iii) allowing the inoperative cleaning robot A to hand over the role to a cleaning robot B presenting a most preferable tender and to return to a waiting place, and vi) relocating the cleaning robot B to a cleaning area to which the inoperative cleaning robot A is assigned. Here, a most preferable reply or the most preferable tender may be a reply or a condition from which the maximum task efficiency may be expected. The inoperative cleaning robot A may be frequently changed during the cleaning.

The hierarchical assignment may include appointing at least one of the multiple cleaning robots as a lead robot and reassigning a task to the multiple cleaning robots by the lead robot. For example, when an area cleaning task is assigned to the multiple cleaning robots, the lead robot and cleaning robots may be appointed for each cleaning area. The appointment may be performed based on at least one of a location, a load capacity, a battery status, and a breakdown occurrence of each cleaning robot. The lead robot may monitor a progress of the cleaning performed by the cleaning robots assigned to the cleaning area of the lead robot. When a portion in the cleaning area is not cleaned, the lead robot may command one of the cleaning robots to clean every corner of the portion. When an inoperative cleaning robot is found or a number of the cleaning robots is smaller or greater in comparison to an amount of garbage in the cleaning area, the lead robot of the cleaning area may exclude the inoperative cleaning robot, or exclude or include a cleaning robot through communication with a lead robot of a different cleaning area or the cooperative cleaning controller.

Figure 9:
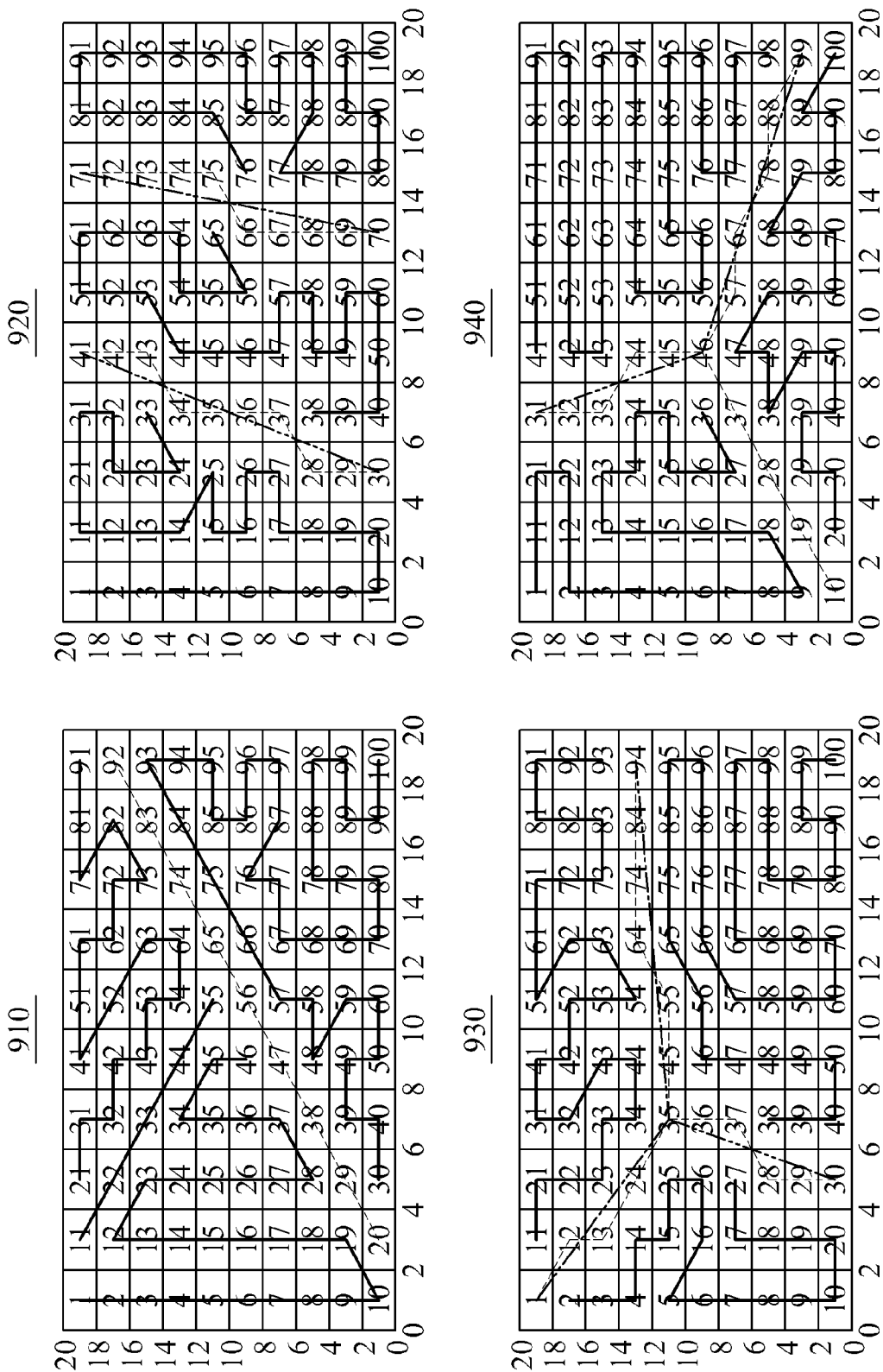
FIG. 9 is a diagram illustrating a method of covering a portion of a cleaning area by multiple cleaning robots according to an embodiment of the present invention.

FIG. 9 is a diagram illustrating a method of covering a portion of a cleaning area by multiple cleaning robots according to an embodiment of the present invention.

Referring to FIG. 9, the multiple cleaning robots may each clean an assigned portion of the cleaning area using the method indicated in charts 910 through 940. When an area cleaning task is assigned to the multiple cleaning robots for the cleaning area, the multiple cleaning robots may apply a plowing method, a spiral moving method, or an arbitrary moving method to clean the assigned cleaning area. Here, conventional technology may be used as an effective cleaning method performed by the multiple cleaning robots.

FIG. 10 is a flowchart illustrating a cooperative cleaning method using multiple cleaning robots according to an embodiment of the present invention.

In operation 1010, an entire building may be partitioned into at least one cleaning area. For example, the entire building may be partitioned into the at least one cleaning area using one of physical partitioning, virtual partitioning, and user arbitrary partitioning. Each of the at least one partitioned cleaning area may be modified based on an amount of garbage in each cleaning area. Here, the at least one cleaning area may be represented by a topology map. In addition to the partitioning methods, descriptions provided with reference to FIG. 2 may be applied hereto and thus, repeated descriptions will be omitted here for conciseness.

In operation 1020, whether a request for cleaning occurs may be monitored. Whether the request for the cleaning occurs may be monitored based on an amount of garbage collected by multiple cleaning robots from the cleaning area or an amount of dust in the cleaning area measured by a dust measuring sensor of the multiple cleaning robots. Descriptions provided with reference to FIGS. 5 and 6 may be applicable to a method of monitoring whether the request for the cleaning occurs and thus, repeated descriptions will be omitted here for conciseness.

In operation 1030, when the request for the cleaning occurs, an area cleaning task may be assigned to the multiple cleaning robots. The task may be assigned based on at least one a size, an amount of garbage, and a priority of the cleaning area. Descriptions provided with FIG. 7 may be applied hereto and thus, repeated descriptions will be omitted here for conciseness.

In operation 1040, a task may be reassigned to the multiple cleaning robots based on information received from the multiple cleaning robots. Here, the information received from the multiple cleaning robots may include information on at least one of a location, a load capacity, a battery status, and a breakdown occurrence of each cleaning robot, and whether an amount of garbage in the cleaning area rapidly increases. For example, the task may be reassigned to the multiple cleaning robots to maximize a task efficiency of the multiple cleaning robots. Also, when at least one of the multiple cleaning robots is inoperative, the inoperative cleaning robot or a cooperative cleaning controller detecting the inoperative cleaning robot may transmit a signal requesting a substitute to adjacent cleaning robots being around the inoperative cleaning robot, the adjacent cleaning robots may send a reply to the signal requesting the substitute to the inoperative cleaning robot or the cooperative cleaning controller based on each state of the adjacent cleaning robots, and the task of the inoperative cleaning robot may be reassigned to a cleaning robot sending the reply and from which a maximum task efficiency may be expected. Also, at least one lead robot may be appointed from among the multiple cleaning robots based on at least one of a location, a load capability, a battery status, and a breakdown occurrence of each of the multiple cleaning robots. The lead robot may reassign the task to the multiple cleaning robots. Descriptions provided with reference to FIG. 8 may be applied hereto and thus, repeated description will be omitted here for conciseness.

FIG. 11 is a diagram illustrating a cooperative cleaning system according to an embodiment of the present invention.

Referring to FIG. 11, the cooperative cleaning system 1100 may include a cooperative cleaning controller 1110 and multiple cleaning robots, for example, 1120 and 1130.

The cooperative cleaning controller 1110 may include a communicator 1111, a cleaning area partitioner 1112, a monitor 1113, a task assignor 1114, and a task reassignor 1115. The cooperative cleaning controller 1110 may assign a task to the multiple cleaning robots 1120 and 1130.

The communicator 1111 may communicate with the multiple cleaning robots 1120 and 1130. The communicator 1111 may transmit the task and a control command, for example, a movement command, to the multiple cleaning robots 1120 and 1130. The communicator 1111 may receive, from the multiple cleaning robots 1120 and 1130, information on at least one of a location, a load capacity, a battery status, and a breakdown occurrence of each of the multiple cleaning robots 1120 and 1130, and whether an amount of a cleaning area rapidly increases.

The cleaning area partitioner 1112 may partition an entire building into at least one cleaning area. Descriptions provided with reference to FIGS. 2 and 3 may be applied to the cleaning area partitioner 1112 and thus, repeated descriptions will be omitted here for conciseness.

The monitor 1113 may monitor whether a request for cleaning occurs based on an amount of garbage collected by the multiple cleaning robots 1120 and 1130 from the cleaning area or an amount of dust in the cleaning area measured by a dust measuring sensor of the multiple cleaning robots 1120 and 1130. Also, the monitor 1113 may monitor a progress of the cleaning based on information received from the multiple cleaning robots 1120 and 1130. Descriptions provided in the foregoing may be applied hereto and thus, a repeated description will be omitted here for conciseness.

When the request for the cleaning occurs, the task assignor 1114 may assign an area cleaning task to the multiple cleaning robots 1120 and 1130. The task assignor 1114 may assign the task based on at least one of a size, an amount of garbage, and a priority of cleaning areas. Descriptions provided with reference to FIG. 7 may be applied hereto and thus, repeated descriptions will be omitted here for conciseness.

The task reassignor 1115 may reassign a task to the multiple cleaning robots 1120 and 1130 based on the information received from the multiple cleaning robots 1120 and 1130. When at least one of the multiple cleaning robots 1120 and 1130 is on standby, the task reassignor 1115 may reassign the task to the standby cleaning robot. When none of the multiple cleaning robots 1120 and 1130 are on standby, the task reassignor 1115 may reassign the task to a cleaning robot assigned to a different cleaning area.

A cleaning robot 1120 of the multiple cleaning robots 1120 and 1130 may include a communicator 1121, a location recognizer 1122, and a cleaning performer 1123.

The communicator 1121 may perform communication with the cooperative cleaning controller 1110. The communicator 1121 may receive the task and the control command, for example, the movement command, from the cooperative cleaning controller 1110. The communicator 1121 may transmit, to the cooperative cleaning controller 1110, information on at least one of the location, the load capacity, the battery status, and the breakdown occurrence of the cleaning robot 1120, and whether an amount of garbage in the cleaning area rapidly increases.

The location recognizer 1122 may include an absolute location recognizer and a relative location recognizer. The location recognizer 1122 may mark an environment, for example, a cleaning area, for recognizing an absolute location. The location recognizer 1122 may read a marker and verify the absolute location of the cleaning robot 1120. The marker may be indicated on a fixed structure, for example, a floor, a ceiling, a wall, and the like. However, when the location recognizer 1122 may not read the marker, the environment may be autonomously modeled based on a camera or a distance sensor provided in the cleaning robot 1120 and a location of the cleaning robot 1120, for example, a relative location, may be estimated in the modeled environment.

The cleaning performer 1123 may perform the cleaning. For example, the cleaning performer 1123 may sweep the floor of the cleaning area to gather dust or collect garbage from the cleaning area.

A cleaning robot 1130 of the multiple cleaning robots 1120 and 1130 and other cleaning robots not shown in FIG. 11 may be configured identically to the cleaning robot 1120.

According to exemplary embodiments, changing only a number of cleaning robots assigned to a cleaning area may considerably reduce a number of operations required for efficient cleaning. Also, when an inoperative cleaning robot is found, immediate measures may be taken by simply replacing the inoperative cleaning robot and thus, the cleaning area may be maintained to be continuously clean.

According to exemplary embodiments, fixing a cleaning area may enable accumulation of data on an amount of garbage generated from the cleaning area and on a cleaning condition of the cleaning area, and an easier management of cleaning.

According to exemplary embodiments, a number of cleaning robots required for an overall cleaning efficiency may be determined and accordingly, a task may be assigned to an operative cleaning robot. Thus, the cleaning may be symmetrically and efficiently performed.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cooperative cleaning method, the method comprising:
   monitoring whether a request for cleaning occurs;
   assigning an area cleaning task to multiple cleaning robots when the request for cleaning occurs;
   appointing at least one of the multiple cleaning robots as a lead robot based on at least one of a location, a loadable capacity, a battery status, and a breakdown occurrence of each of the multiple cleaning robots; and
   reassigning a task to the multiple cleaning robots by the lead robot based on information received from the multiple cleaning robots.

2. The method of claim 1, wherein the monitoring is performed based on an amount of garbage collected by the multiple cleaning robots from a cleaning area or an amount of dust in the cleaning area measured by a dust measuring sensor of the multiple cleaning robots.

3. The method of claim 1, wherein the assigning is performed based on at least one of a size, an amount of garbage, and a priority of the cleaning area.

4. The method of claim 1, wherein the information received from the multiple cleaning robots comprises information on at least one of a location, a load capacity, a battery status, and a breakdown occurrence for each of the multiple cleaning robots, and whether an amount of garbage in the cleaning area rapidly increases.

5. The method of claim 4, wherein the location of each of the multiple cleaning robots comprises one of an absolute location using a marker in the cleaning area and a relative location without using the marker.

6. The method of claim 1, wherein the reassigning is performed to maximize a task efficiency of the multiple cleaning robots.

7. The method of claim 1, wherein the reassigning comprises:
   determining whether at least one of the multiple cleaning robots is inoperative;
   when it is determined that at least one of the multiple cleaning robots is inoperative, transmitting a signal requesting a substitute for the inoperative robot from adjacent cleaning robots;
   receiving, from the adjacent cleaning robots, a reply to the signal requesting the substitute based on an individual status of the adjacent cleaning robots; and
   reassigning a task of the inoperative robot to a cleaning robot sending the reply and from which a maximum task efficiency is expected.

8. The method of claim 1, further comprising:
   partitioning an entire building into at least one cleaning area using one of physical partitioning, virtual partitioning, and arbitrary partitioning, and
   modifying the at least one partitioned cleaning area based on an amount of garbage in each cleaning area.

9. A cooperative cleaning method, the method comprising:
   assigning an area cleaning task to multiple cleaning robots when a request for cleaning occurs;
   determining whether at least one of the multiple cleaning robots is on standby when at least one of the multiple cleaning robots becomes inoperative; and
   when it is determined that none of the multiple cleaning robots are on standby,
      appointing at least one of the multiple cleaning robots as a lead robot based on at least one of a location, a loadable capacity, a battery status, and a breakdown occurrence of each of the multiple cleaning robots, and
      reassigning a task to a cleaning robot assigned to a different cleaning area.

10. The method of claim 9, wherein the assigning is performed based on at least one of a size, an amount of garbage, and a priority of the cleaning area.

11. The method of claim 9, further comprising:
    when it is determined that at least one of the multiple cleaning robots is on standby, reassigning the task to the standby cleaning robot.

12. The method of claim 9, wherein the reassigning of the task to the cleaning robot assigned to the different cleaning area is performed to maximize a task efficiency of the multiple cleaning robots.

13. The method of claim 9, wherein the reassigning of the task to the cleaning robot assigned to the different cleaning area comprises:
    transmitting a signal requesting a substitute to cleaning robots assigned to the different cleaning area;
    receiving, from the cleaning robots assigned to the different cleaning area, a reply to the signal requesting the substitute based on an individual status of the cleaning robots; and reassigning a task of the inoperative cleaning robot to a cleaning robot sending that sent the reply and from which a maximum task efficiency is expected.

14. The method of claim 9, wherein the reassigning of the task to the cleaning robot assigned to the different cleaning area comprises
allowing, by the lead robot, a lead robot of a different cleaning area to reassign a task to the cleaning robot assigned to the different cleaning area.

15. The method of claim 9, wherein the reassigning of the task to the cleaning robot assigned to the different cleaning area comprises:
reassigning a task to the cleaning robot assigned to the different cleaning area by a cooperative cleaning controller.

16. A cooperative cleaning controller, the controller comprising:
a communicator configured to communicate with multiple cleaning robots;
a task assignor configured to assign an area cleaning task to the multiple cleaning robots when a request for cleaning occurs; and
a task reassignor configured to:
determine whether at least one of the multiple cleaning robots is on standby based on information received from the multiple cleaning robots,
appoint at least one of the multiple cleaning robots as a lead robot based on at least one of a location, a loadable capacity, a battery status, and a breakdown occurrence of each of the multiple cleaning robots, and
reassign a task to a cleaning robot assigned to a different cleaning area when it is determined that none of the multiple cleaning robots are on standby.

17. The controller of claim 16, wherein the task assignor assigns the task based on at least one of a size, an amount of garbage, and a priority of a cleaning area.

18. The controller of claim 16, wherein the task reassignor reassigns a task to the standby cleaning robot when it is determined that at least one of the multiple cleaning robots is on standby.

19. The controller of claim 16, further comprising:
a monitor configured to monitor whether the request for cleaning of the cleaning area occurs based on an amount of garbage collected by the multiple cleaning robots from the cleaning area or an amount of dust in the cleaning area measured by a dust measuring sensor of the multiple cleaning robots.

20. The controller of claim 16, wherein the task reassignor reassigns the task to the cleaning robot assigned to the different cleaning area in response to a communication from the lead robot.

* * * * *